United States Patent
Nagorny et al.

(10) Patent No.: US 7,132,483 B2
(45) Date of Patent: Nov. 7, 2006

(54) WATER-BASED COATING COMPOSITIONS CONTAINING EPOXY RESIN(S) AND (METH)ACRYLATE(S), AND METHODS OF USING THE SAME

(75) Inventors: Ulrich Nagorny, Hilden (DE); Rainer Hoefer, Duesseldorf (DE)

(73) Assignee: Cognis Deutschland GmbH & Co. KG, Duesseldorf (DE)

( * ) Notice: Subject to any disclaimer, the term of this patent is extended or adjusted under 35 U.S.C. 154(b) by 191 days.

(21) Appl. No.: 10/474,664

(22) PCT Filed: Apr. 10, 2002

(86) PCT No.: PCT/EP02/03982

§ 371 (c)(1),
(2), (4) Date: Oct. 14, 2003

(87) PCT Pub. No.: WO02/085998

PCT Pub. Date: Oct. 31, 2002

(65) Prior Publication Data

US 2004/0110873 A1 Jun. 10, 2004

(30) Foreign Application Priority Data

Apr. 19, 2001 (DE) ................ 101 19 127

(51) Int. Cl.
  *C08L 63/00* (2006.01)
(52) U.S. Cl. ............... 525/532; 525/529; 525/523; 523/402
(58) Field of Classification Search ................ None
See application file for complete search history.

(56) References Cited

U.S. PATENT DOCUMENTS

| | | | |
|---|---|---|---|
| 3,383,434 A | 5/1968 | Carlston | |
| 4,051,195 A | 9/1977 | McWhorter | |
| 4,524,107 A | 6/1985 | Marchetti et al. | |
| 5,352,525 A | 10/1994 | Huemke et al. | |
| 5,536,775 A | 7/1996 | Curatolo et al. | |
| 5,925,499 A * | 7/1999 | Hernandez et al. | 430/280.1 |
| 6,277,190 B1 | 8/2001 | Schulte et al. | |
| 6,399,735 B1 | 6/2002 | Fischer et al. | |

FOREIGN PATENT DOCUMENTS

| | | |
|---|---|---|
| DE | 37 43 873 A1 | 7/1989 |
| DE | 42 42 687 A1 | 6/1994 |
| DE | 195 04 528 A1 | 8/1995 |
| EP | 0 558 986 A1 | 9/1993 |
| EP | 0 634 424 B1 | 1/1995 |
| WO | WO 96/20971 A1 | 7/1996 |
| WO | WO 97/03108 A1 | 1/1997 |
| WO | WO 98/49114 A1 | 11/1998 |
| WO | WO 00/04106 A1 | 1/2000 |

OTHER PUBLICATIONS

A. Hinze, Die Herstellung von Dimerfettsäuren aus ungesättigten Fettsäuren, Fette & Öle, 26, (1994), pp. 47-51.
L. S. Newton, "Dimer Acids and their Derivatives-Potential Applications", Speciality Chemicals, (May 1984), pp. 17, 18, 22-24.
V. P. Daute, et al., "Hydrolysestabile fettchemische Polyole für Polyurethananwendungen", Fat Sci. Technol., 95, (1993), No. 3, pp. 91-94.
A. M. Paquin, "Epoxidverbindungen und Epoxidharze", Springer-Verlag, Berlin, (1958), Chapter V, pp. 308-461.
Lee, "Handbook of Epoxy Resins", Chapter 2, (1967), pp. 2-1 to 2-33.
U. Zorll (Ed.), Römpp-Lexikon, Lacke und Druckfarben, Georg Thieme Verlag, Stuttgart, New York, (1998), p. 615.
R. Neumann, et al., Pulver, das Elgenschaften schafft, Sonderdruck aus Bautenschutz und Bausanierung, Heft (Mar. 1999), pp. 22-23, 26-27.
U. Nagorny, "Extension of Workability Of Synthetic Resin Plasters With Additives Based On Fatty Raw Materials", ConChem-Journal, (Jan. 1994), pp. 23-26.
G. Schulte, et al., Additive für wässrige Systeme und umweltfreudliche Lacke, Welt der Farben, (Dec. 1997), pp. 28-31.

* cited by examiner

*Primary Examiner*—Michael J. Feely
(74) *Attorney, Agent, or Firm*—John F. Daniels; Jane E. Alexander

(57) ABSTRACT

Water-based coating composition comprising: (a) from 0.5 to 90% by weight of at least one epoxy resin other than self-dispersing epoxy resins; (b) from 0.5 to 90% by weight of at least one (meth)acrylate of a polyol; (c) from 5.0 to 98.0% by weight of water; and (d) from 0.5 to 10% by weight of one or more dispersants; wherein the at least one (meth)acrylate comprises at least two (meth)acrylate groups per molecule, and wherein the Brookfield viscosity of the composition is less than 15000 mPas.

18 Claims, No Drawings

WATER-BASED COATING COMPOSITIONS CONTAINING EPOXY RESIN(S) AND (METH)ACRYLATE(S), AND METHODS OF USING THE SAME

BACKGROUND OF THE INVENTION

WO-A-00/04106 describes coating systems containing water, epoxy resin and polyacrylates ("functional polyacrylate latex=true polymers"). These systems are contacted with amine hardeners and cured. The coatings obtainable in this way are said to be suitable for metal surfaces, particularly steel, and can be subsequently overcoated with bitumen.

DE-A-195 04 528 describes amine-curable compositions containing a partly acrylated epoxy resin, i.e. a compound in which both epoxy and (meth)acrylate functionality are present in one and the same molecule. These compositions are said to be suitable for the production of coatings, particularly floor underlays. The acrylated resin is a partly acylated epoxide monomer or oligomer and has a molecular weight of 150 to 10,000 and contains at least one epoxide group and at least one terminal (meth)acrylate group. The hardener is a mono-, di- or polyamine.

U.S. Pat. No. 4,051,195 describes curable compositions containing an epoxy resin (with more than 1.2 epoxy groups per molecule) and a poly(meth)acrylate ester of a polyol, this ester containing >1 terminal (meth)acrylic acid group. The compositions are cured with aliphatic polyamines (containing at least 3 amine H atoms per molecule). Examples of the polyester are hexanediol diacrylate and trimethylolpropane triacrylate. The described system is substantially water-free and solvent-free (in the Examples, the water content according to the Table is between 0.1 and 0.3% and the solvent content between 0.04 and 1.55%).

U.S. Pat. No. 3,383,434 describes curable compositions based on diepoxide, unsaturated polyester and polyamine (containing 2 primary amine groups). The composition cures at low temperatures. The amine is said to react with the C=C double bonds of the polyester to form crosslinked resins. The systems are said to have a short gel time and low exothermy. The polyesters are derived from aliphatic glycols and unsaturated aliphatic dicarboxylic acids.

U.S. Pat. No. 4,524,107 describes water-based epoxy resin compositions for impregnating fibers. The composition is an aqueous emulsion of an epoxy resin, a hardener and an impact modifier. The impact modifiers are polymers which are generally produced by emulsion polymerization.

BRIEF SUMMARY OF THE INVENTION

The present invention relates, in general, to water-based coating compositions containing curable components, to a process for the production of coatings and to the use of the coating compositions.

The problem addressed by the present invention was to provide curable water-based coating compositions. These compositions would have at most a small content of organic solvents but would preferably be free from such solvents. In addition, the compositions would be distinguished by good handling and application behavior (=incorporation in industrially usable systems).

Coating Compositions

The present invention relates to water-based coating compositions containing curable components, characterized in that they consist of A) 0.5 to 90% by weight epoxy resins excluding self-dispersing epoxy resins,
B) 0.5 to 90% by weight (meth)acrylates of a polyol,
C) 5.0 to 98.0% by weight water,
D) 0 or 0.1 to 3% by weight organic solvent and
X) 0.5 to 10% by weight one or more dispersants, with the following provisos:
 the (meth)acrylates B) contain at least 2 reactive (meth)acrylic groups per molecule,
 the sum of the percentages by weight of components A), B), C), D) and X) is 100% by weight and
 the Brookfield viscosity of the composition (as measured at 23° C.) is less than 15,000 mPas.

DETAILED DESCRIPTION OF THE INVENTION

Component A)

Component A) of the coating compositions according to the invention is formed by epoxy resins excluding self-dispersing epoxy resins. This condition means that the epoxy resins do not lead to a dispersion spontaneously, i.e. without the addition of emulsifiers, dispersants or the like, when water is added. Dispersions in the context of the invention are understood to include both dispersions per se and emulsions.

In one embodiment, the epoxy resins A) are reaction products of bisphenol A and/or bisphenol F with epichlorohydrin.

Examples of commercially available compounds A) are the products Chem-Res E 30 and Epikote 828 which can be obtained from Cognis Deutschland GmbH.

In one embodiment, component A) is used in a quantity of 5 to 50% by weight and preferably in a quantity of 20 to 50% by weight.

Component B)

The compounds B) are (meth)acrylates of a polyol with the proviso that they must contain at least 2 reactive (meth)acrylic groups per molecule.

An acrylic group in the context of the invention is an —O—CO—CH=CH$_2$ group while a methacrylic group is an —O—CO—C(CH$_3$)=CH$_2$ group.

The components B) may readily be obtained by completely or partly esterifying polyols with acrylic acid and/or methacrylic acid.

In the context of the invention, polyols suitable for the production of component B) in the broadest sense are any organic compounds which contain at least two OH groups per molecule. The OH groups may be both directly attached to an aliphatic group, as for example with alkanediols (for example glycols) or alkanetriols (for example glycerol or trimethylolpropane), and directly attached to an aromatic group (as for example with bisphenol A).

Suitable compounds B) are, for example, those disclosed on page 5, lines 45 to 64 of DE-A-195 04 528.

The following are particularly preferred compounds B):
 ethylene glycol di(meth)acrylate,
 hexane-1,6-diol di(meth)acrylate, reaction products of acrylic acid and/or methacrylic acid with products of the addition of 1 to 200 mol ethylene oxide and/or propylene oxide onto hexane-1,6-diol;
 trimethylol propane di(meth)acrylate, trimethylol propane tri(meth)acrylate, reaction products of in all 2 to 3 mol acrylic acid and/or methacrylic acid with products of the addition of 1 to 200 mol ethylene oxide and/or propylene oxide onto trimethylol propane;

glycerol di(meth)acrylate, glycerol tri(meth)acrylate, fatty acid monoglyceride di(meth)acrylate, acrylated and/or methacrylated soya oil epoxide, acrylated and/or methacrylated linseed oil epoxide, reaction products of acrylic acid and/or methacrylic acid with products of the addition of 1 to 200 mol ethylene oxide and/or propylene oxide onto glycerol;

reaction products of acrylic acid and/or methacrylic acid with (bisphenol A and/or bisphenol F) diglycidyl ether, reaction products of acrylic acid and/or methacrylic acid with products of the addition of 1 to 200 mol ethylene oxide and/or propylene oxide onto (bisphenol A and/or bisphenol F) diglycidyl ether;

reaction products of acrylic acid and/or methacrylic acid with $\alpha,\omega$-diols obtainable by reaction of 1 mol bisphenol A (or bisphenol F) with 2 mols glycerol, subsequent reaction of the OH-terminated diether obtained with 2 mols maleic, glutaric or succinic anhydride and further reaction of the carboxyl-terminated intermediate product obtained with 2 mols of an aliphatic diol (preferably an OH-terminated diol).

Component C)

Component C) is water so that further special explanations are not necessary. In one embodiment, the quantity of C) is 10 to 50% by weight and more particularly 35 to 50% by weight.

Component D)

Component D) is formed by solvents. Basically, any organic solvents known to the relevant expert may be used. However, solvents known to the expert on coating technology are preferably used. Examples of suitable solvents are those from the classes of mono-, di- or polyalcohols, glycol esters, glycol ethers; aliphatic, cycloaliphatic and aromatic hydrocarbons and, finally, ketones.

Component X)

Component X) is formed by dispersants. These are substances which are capable of dispersing or emulsifying the epoxy resins A) to be used in accordance with the invention in water.

Corresponding dispersants are known to the expert.

The dispersants X) are preferably selected from the group of anionic and nonionic surfactants.

Examples of suitable anionic dispersants X) include fatty alcohol sulfates and fatty alcohol ether sulfates.

Suitable nonionc disperants X) are, for example, fatty alcohols and products of the addition of in all 1 to 200 (preferably 10 to 110) mol ethylene oxide and/or propylene oxide onto fatty alcohols and/or alkylphenols, alkyl polyglucosides.

Production of the Coating Compositions

The coating compositions may be produced by any methods known to the expert. In particular, the components may be successively mixed with one another. Equally, however, two or more components may first be prepared in advance and then contacted in that form with other components to form the final coating composition. This particular variant applies in particular to component C) (water). Water may be introduced into the system as a whole in many different ways during the production of the coating compositions according to the invention. For example, compounds of classes A) and/or B), particularly commercially available types, may be used in an aqueous supply form. In other words, water may either be introduced with the other compulsory components of the coating composition or may even be introduced by using individual or all components A) and/or B) in aqueous supply forms. A combination of both methods is also possible.

The percentages by weight for components A) and B) are always based on the particular active substance content. If, for example, a coating composition is produced by using one or more components in aqueous supply forms, the crucial factor in regard to characterization of the composition of the coating composition as a whole for the individual components is how much particular active substance is present and not whether certain components were used in water-free or water-containing form in the production of the coating composition. Accordingly, the percentage of component C), i.e. water, is always the total of the water present in the coating composition as a whole.

It is specifically pointed out that components A), B) and D) may be used as individual species or as mixtures of such species. Accordingly, both one and also several epoxy resins A), (meth)acrylates B) and solvents D) may be used.

In one embodiment, the solubility of component B) in water is less than 0.1 g/l.

The coating compositions according to the invention are curable compositions. Curing may be carried out by any of the methods known to the relevant expert. In particular, radiation curing (for example UV curing) may be used by virtue of the content in the compositions according to the invention of component B) which contains C=C double bonds. It may also be desirable to use typical epoxy resin hardeners. In one embodiment, radiation curing is combined with curing by addition of an epoxy resin hardener.

Coating Process

The present invention also relates to a process for the production of coatings, characterized in that a composition consisting of A) 0.5 to 90% by weight epoxy resins excluding self-dispersing epoxy resins,
B) 0.5 to 90% by weight (meth)acrylates of a polyol,
C) 5.0 to 98.0% by weight water,
D) 0 or 0.1 to 3% by weight organic solvent and
X) 0.5 to 10% by weight one or more dispersants, with the following provisos:
the (meth)acrylates B) contain at least 2 reactive (meth)acrylic groups per molecule,
the sum of the percentages by weight of components A), B), C), D) and X) is 100% by weight and
the Brookfield viscosity of the composition (as measured at 23° C.) is less than 15,000 mPas is contacted with
E) 1 to 200% by weight water-dilutable hardeners—% by weight hardeners based on the epoxy resins A) and
F) 0 to 90% by weight other additives and/or processing aids—% by weight component F) based on the total quantity of all components, and the resulting mixture is brought into the required shape and allowed to cure.

Hardeners for the Process According to the Invention

Water-dilutable hardeners are used as component E) in the process according to the invention. In principle, the hardener may be selected from any of the epoxy resin hardeners known to the relevant expert. Examples of suitable epoxy resin hardeners are functional amine compounds, functional phenolic resins, functional mercaptans, functional anhydrides or carboxylic acids which contain at least one functional group, but preferably several such groups. The compounds suitable as epoxy resin hardeners mentioned here are known to the expert.

Polyfunctional amine compounds which allow curing at moderate temperatures are preferably used as component E) in the process according to the invention. Examples of suitable compounds of this class are mentioned in WO 00/04106 cited at the beginning (cf. page 3, line 10 to page 4, line 12). The compounds mentioned there are expressly included in the disclosure of the present invention.

In one embodiment, compounds derived from adducts based on α,β-unsaturated carboxylic acid esters and mono-, di- or polyaminopolyalkylene oxide compounds are used as component E). More particularly, the compounds E) are selected from the group of types E1) to E3) described hereinafter.

Hardeners of the E1) type are obtainable by (a) reacting one or more α,β-unsaturated carboxylic acid esters (I)

$$R^2R^3C=C(R^4)COOR^1 \quad (I)$$

where $R^1$ is an aromatic or aliphatic radical containing up to 15 carbon atoms, the substituents $R^2$, $R^3$ and $R^4$ independently of one another represent hydrogen, branched or unbranched, aliphatic or aromatic groups containing up to 20 carbon atoms or a group —$(CH_2)_n$—$COOR^1$, where $R^1$ is as defined above and n is a number of 0 to 10, in the presence of a transesterification catalyst with (b) one or more hydroxy compounds, compounds (a) and (b) being used in such quantities that the equivalent ratio of the hydroxyl groups in (b) to the ester groups $COOR^1$ in the α,β-unsaturated carboxylic acid esters (a) is in the range from 1.5:1 to 10:1, reacting the intermediate product Z1 obtained with (c) one or more mono-, di- or polyaminopolyalkylene oxide compounds, an equivalent ratio of the reactive hydrogen atoms at the aminonitrogen atoms of (c) to the ester groups in the intermediate compound Z1 in the range from 10:1 to 1:10 being adjusted, subsequently reacting the intermediate product Z2 obtained with (d) one or more polyepoxides, the equivalent ratio of oxirane rings in polyepoxide (d) to reactive hydrogen atoms of the mono-, di- or polyaminopolyalkylene oxide compounds used in (c) being adjusted to a value of 100:1 to 1.5:1, and subsequently reacting the intermediate product Z3 obtained with (e) one or more primary and/or secondary amines, the equivalent ratio of oxirane rings in the intermediate product Z3 to the reactive H atoms at the aminonitrogen atoms of (e) being adjusted to a value of 1:1.5 to 1:20.

The hardeners to be used in accordance with the invention are either liquid or solid substances, depending on their molecular weight.

The expression "equivalent ratio" is familiar to the expert. The basic concept behind the notion of the equivalent is that, for every substance participating in a reaction, the reactive groups involved in the desired reaction are taken into consideration. By indicating an equivalent ratio, it is possible to express the ratio which all the various reactive groups of the compounds (x) and (y) used bear to one another. It is important in this connection to bear in mind that a reactive group is understood to be the smallest possible reactive group, i.e. the notion of the reactive group is not identical with the notion of the functional group. In the case of H-acid compounds, this means for example that, although OH groups or NH groups represent such reactive groups, $NH_2$ groups with two reactive H atoms positioned at the same nitrogen atom do not. In their case, the two hydrogen atoms within the functional group $NH_2$ are appropriately regarded as reactive groups so that the functional group $NH_2$ contains two reactive groups, namely the hydrogen atoms.

In one embodiment, the intermediate compound Z1 and the compound (c) are used in such quantities that the equivalent ratio of reactive hydrogen atoms at the aminonitrogen atoms of (c) to the ester groups in the intermediate compound Z1 is in the range from 4:1 to 1:4 and more particularly in the range from 2.5:1 to 1.5:1.

In another embodiment, the equivalent ratio of oxirane rings in the polyepoxide (d) to reactive hydrogen atoms of the mono-, di- or polyaminopolyalkylene oxide compounds used in (c) is adjusted to a value in the range from 50:1 to 10:1.

Examples of the α,β-unsaturated carboxylic acid esters (a) corresponding to formula (I) to be used in accordance with the invention are methyl acrylate, ethyl acrylate, dimethyl maleate, diethyl maleate, dimethyl fumarate, diethyl fumarate, dimethyl itaconate, diethyl itaconate. Particularly preferred compounds (a) are dialkyl maleates, more particularly diethyl maleate and dimethyl maleate.

The hydroxy compounds (b) may be aliphatic or aromatic. The compounds (b) should be inert to transesterification catalysts.

Examples of suitable aromatic compounds (b) are resorcinol, hydroquinone, 2,2-bis-(4-hydroxyphenyl)-propane (bisphenol A), isomer mixtures of dihydroxydiphenyl methane (bisphenol F), tetrabromobisphenol A, 4,4'-dihydroxydiphenyl cyclohexane, 4,4'-dihydroxy-3,3-dimethyldiphenyl propane, 4,4'-dihydroxydiphenyl, 4,4'-dihydroxybenzophenol, bis-(4-hydroxyphenyl)-1,1-ethane, bis-(4-hydroxyphenyl)-1,1-isobutane, bis-(4-hydroxyphenyl)-methane, bis-(4-hydroxyphenyl)-ether, bis-(4-hydroxyphenyl)-sulfone etc. and the chlorination and bromination products of the above-mentioned compounds. Bisphenol A is the preferred aromatic compound (b).

In one preferred embodiment, the hydroxy compounds (b) are selected from the class of fatty alcohols, alkanediols and polyetherdiols. If desired, these compounds may also be alkoxylated.

The fatty alcohols are primary alcohols containing 6 to 36 carbon atoms which may be saturated or olefinically unsaturated. Examples of suitable fatty alcohols are hexanol, heptanol, octanol, pelargonyl alcohol, decanol, undecanol, lauryl alcohol, tridecanol, myristyl alcohol, pentadecanol, palmityl alcohol, heptadecanol, stearyl alcohol, nonadecanol, arachidyl alcohol, heneicosanol, behenyl alcohol, tricosanol, lignoceryl alcohol, 10-undecanol, oleyl alcohol, elaidyl alcohol, ricinolyl alcohol, linoleyl alcohol, linolenyl alcohol, gadoleyl alcohol, arachidonyl alcohol, erucyl alcohol, brassidyl alcohol.

The alkanediols are compounds corresponding to the general formula $HOCH_2$—$R^5$—$CH_2OH$, where $R^5$ is a hydrophobic hydrocarbon radical which may be saturated or unsaturated, linear or branched and may also contain aromatic structural elements. Examples are hexane-1,6-diol, heptane-1,7-diol and octane-1,8-diol, polyoxytetramethylenediols—also known as polytetrahydrofurans—and the so-called dimerdiols. Dimer diols are most particularly preferred for the purposes of the present invention.

Dimerdiols are well-known commercially available compounds which are obtained, for example, by reduction of dimer fatty acid esters. The dimer fatty acids on which these dimer fatty acid esters are based are carboxylic acids which may be obtained by oligomerization of unsaturated carboxylic acids, generally fatty acids, such as oleic acid, linoleic acid, erucic acid and the like. The oligomerization is normally carried out at elevated temperature in the presence of a catalyst, for example of clay. The substances obtained—dimer fatty acids of technical quality—are mixtures in which the dimerization products predominate. However, small amounts of higher oligomers, more particularly the trimer fatty acids, are also present. Dimer fatty acids are commercially available products and are marketed in various compositions and qualities. Abundant literature is available on the subject of dimer fatty acids, cf. for example the following articles: Fette & Öle 26 (1994), pages 47–51; Speciality Chemicals 1984 (May Number), pages 17, 18, 22–24. Dimerdiols are well-known among experts, cf. for example a more recent article in which inter alia the production, structure and chemistry of the dimerdiols are discussed: Fat Sci. Technol. 95 (1993), No. 3, pages 91–94. According to the invention, preferred dimerdiols are those which have a dimer content of at least 50% and more particularly 75% and in which the number of carbon atoms per dimer molecule is mainly in the range from 36 to 44.

Polyetherdiols in the context of the present invention are diols corresponding to the general formula $HOCH_2$—$R^6$—$CH_2OH$, where $R^6$ is a hydrophobic hydrocarbon radical which may be saturated or unsaturated, linear or branched and may also contain aromatic structural elements and in which one or more $CH_2$ units must each be replaced by an oxygen atom.

A particularly attractive class of polyetherdiols can be obtained by alkoxylation of alkanediols, such as ethane-1,2-diol, propane-1,3-diol, propane-1,2-diol, butane-1,4-diol, butane-1,3-diol, pentane-1,5-diol, hexane-1,6-diol, heptane-1,7-diol and octane-1,8-diol, polyoxytetramethylenediols (polytetrahydrofurans) and dimerdiols. The production of these alkoxylated diols is normally carried out as follows: in a first step, the required diol is contacted with ethylene oxide and/or propylene oxide and the resulting mixture is reacted in the presence of an alkaline catalyst at temperatures of 20 to 200° C. Addition products of ethylene oxide (EO) and/or propylene oxide (PO) onto the diol used are obtained in this way. The addition products are therefore EO adducts or PO adducts or EO/PO adducts with the particular diol; in the case of the EO/PO adducts, the addition of EO and PO may take place statistically or blockwise.

Suitable transesterification catalysts for the reaction of the compounds (a) and (b) are any transesterification catalysts known to the expert from the prior art. Examples of suitable catalysts are sodium methylate, dibutyl tin diacetate, tetraisopropyl orthotitanate. If desired, the catalysts may be deactivated after the transesterification although this is not absolutely essential.

Suitable amino components (c) are mono-, di- or polyaminopolyalkylene oxide compounds. By this is meant that these compounds contain, on the one hand, one two or more amino functions (NH or $NH_2$ functions) and, on the other hand, alkylene oxide units. The alkylene oxide units are, in particular, ethylene oxide, propylene oxide and butylene oxide, ethylene oxide and propylene oxide being particularly preferred. The compounds (c) are substances at least partly soluble in water at 20° C.

The production of the compounds (c) is known from the prior art and comprises the reaction of hydroxyfunctional compounds with alkylene oxides and subsequent conversion of the resulting terminal hydroxyl groups into amino groups.

So far as the reaction of hydroxyfunctional compounds with alkylene oxides is concerned, ethoxylation and propoxylation are of particular importance. The following procedure is usually adopted: in a first step, the required hydroxyfunctional compounds are contacted with ethylene oxide and/or propylene oxide and the resulting mixture is reacted in the presence of an alkaline catalyst at temperatures in the range from 20 to 200° C. Addition products of ethylene oxide (EO) and/or propylene oxide (PO) are obtained in this way. The addition products are preferably EO adducts or PO adducts or EO/PO adducts with the particular hydroxyfunctional compound. In the case of the EO/PO adducts, the addition of EO and PO may be carried out statistically or blockwise.

In one embodiment, substances with the general formula $R^8$—O—$R^9$—$CH_2CH(R^{10})$—$NH_2$ are used as the compounds (c). In this formula:

$R^8$ is a monofunctional organic group containing 1 to 12 carbon atoms which may be aliphatic, cycloaliphatic or aromatic, $R^9$ is a polyoxyalkylene group made up of 5 to 200 polyoxyalkylene units, more particularly EO and/or PO units, $R^{10}$ is hydrogen or an aliphatic radical containing up to 4 carbon atoms.

Particularly suitable representatives of the compounds (c) for the purposes of the present invention are the "Jeffamines" known to the expert which are commercially available substances. One example is "Jeffamine 2070" which, according to the manufacturer Texaco, is produced by reacting methanol with ethylene oxide and propylene oxide and then converting the terminal hydroxyl groups of the intermediate product initially obtained into amine groups (cf. WO 96/20971, page 10, lines 12–15).

The compounds (c) preferably have average molecular weights (number average Mn) of 148 to 5,000 and more particularly in the range from 400 to 2,000.

The epoxy compounds (d) are polyepoxides containing on average at least two epoxy groups per molecule. These epoxy compounds may be both saturated and unsaturated and aliphatic, cycloaliphatic, aromatic and heterocyclic and may also contain hydroxyl groups. They may also contain substituents which do not cause any troublesome secondary reactions under the mixing and reaction conditions, for example alkyl or aryl substituents, ether groups and the like. These epoxy compounds are preferably polyglycidyl ethers based on polyhydric, preferably dihydric, alcohols, phenols, hydrogenation products of these phenols and/or novolaks (reaction products of mono- or polyhydric phenols with aldehydes, more particularly formaldehyde, in the presence of acidic catalysts). The epoxy equivalent weights of these epoxy compounds are preferably between 160 and 500 and more preferably between 170 and 250. The epoxy equivalent weight of a substance is the quantity of the substance (in grams) which contains 1 mole of oxirane rings. Preferred polyhydric phenols are the following compounds: resorcinol, hydroquinone, 2,2-bis-(4-hydroxyphenyl)-propane (bisphenol A), isomer mixtures of dihydroxydiphenyl methane (bisphenol F), tetrabromobisphenol A, 4,4'-dihydroxydiphenyl cyclohexane, 4,4'-dihydroxy-3,3-dimethyldiphenyl propane, 4,4'-dihydroxydiphenyl, 4,4'-dihydroxybenzophenol, bis-(4-hydroxyphenyl)-1,1-ethane, bis-(4-hydroxyphenyl)-1,1-isobutane, bis-(4-hydroxyphenyl)-methane, bis-(4-hydroxyphenyl)-ether, bis-(4-hydroxyphenyl)-sulfone etc. and the chlorination and bromination products of the abovementioned compounds. Bisphenol A is most particularly preferred.

Bisphenol A

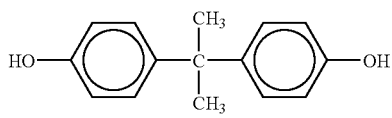

The polyglycidyl ethers of polyhydric alcohols are also suitable compounds (d). Examples of such polyhydric alcohols are ethylene glycol, diethylene glycol, triethylene glycol, 1,2-propylene glycol, polyoxypropylene glycols (n=1–20), 1,3-propylene glycol, 1,4-butylene glycol, pentane-1,5-diol, hexane-1,6-diol, hexane-1,2,6-triol, glycerol and bis-(4-hydroxycyclohexyl)-2,2-propane.

Other suitable compounds (d) are polyglycidyl ethers of polycarboxylic acids obtained by reaction of epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerized linolenic acid. Examples are adipic acid diglycidyl ester, phthalic acid diglycidyl ester and hexahydrophthalic acid diglycidyl ester.

A comprehensive list of suitable epoxy compounds (d) can be found in:

A. M. Paquin, "Epoxidverbindungen und Epoxidharze", Springer-Verlag, Berlin 1958, Chapter V, pages 308 to 461 and Lee, Neville "Handbook of Epoxy Resins" 1967, Chapter 2, pages 201 and 2–33.

Mixtures of several epoxy compounds (d) may also be used,

Amines (e) suitable for the purposes of the invention are primary and/or secondary amines. Preferred amines (e) are polyamines containing at least two nitrogen atoms and at least two active aminohydrogen atoms per molecule. Aliphatic, aromatic, aliphatic-aromatic, cycloaliphatic and heterocyclic di- and polyamines may be used.

The following are examples of suitable amines (e): polyethylene amines (ethylene diamine, diethylene triamine, triethylene tetramine, tetraethylene pentamine, etc.), 1,2-propylene diamine, 1,3-propylene diamine, 1,4-butane diamine, 1,5-pentane diamine, 1,3-pentane diamine, 1,6-hexane diamine, 3,3,5-trimethyl-1,6-hexanediamine, 3,5,5-trimethyl-1,6-hexane diamine, 2-methyl-1,5-pentane diamine, bis-(3-aminopropyl)-amine, N,N'-bis-(3-aminopropyl)-1,2-ethane diamine, N-(3-aminopropyl)-1,2-ethane diamine, 1,2-diaminocyclohexane, 1,3-diaminocyclohexane, 1,4-diaminocyclohexane, aminoethyl piperazines, the poly(alkylene oxide)diamines and triamines (such as, for example, Jeffamine D-230, Jeffamine D400, Jeffamine D-2000, Jeffamine D-4000, Jeffamine T403, Jeffamine EDR-148, Jeffamine EDR-192, Jeffamine C-346, Jeffamine ED-600, Jeffamine ED-900, Jeffamine ED-2001), metaxylylene diamine, phenylene diamine, 4,4'-diaminodiphenyl methane, toluene diamine, isophorone diamine, 3,3'-dim-ethyl-4,4'-diaminodicyclohexyl methane, 4,4'-diaminodicyclohexylmethane, 2,4'-diaminodicyclohexyl methane, the mixture of poly(cyclohexylaromatic)amines attached by a methylene bridge (also known as MBPCAA) and polyaminoamides.

Other suitable compounds (e) are the reaction products of the amines just mentioned with the above-described α,β-unsaturated carboxylic acid esters (a) and the reaction products of the amines just mentioned with the above-described polyepoxy compounds (d).

Hardeners of the E2) type are obtainable by (a) reacting one or more α,β-unsaturated carboxylic acid esters (I):

$$R^2R^3C=C(R^4)COOR^1 \qquad (I)$$

where $R^1$ is an aromatic or aliphatic radical containing up to 15 carbon atoms, the substituents $R^2$, $R^3$ and $R^4$ independently of one another represent hydrogen, branched or unbranched, aliphatic or aromatic groups containing up to 20 carbon atoms or a group —$(CH_2)_n$—$COOR^1$, where $R^1$ is as defined above and n is a number of 0 to 10, with (c) one or more mono-, di- or polyaminopolyalkylene oxide compounds, compounds (a) and (c) being used in such quantities that the equivalent ratio of the reactive hydrogen atoms at the aminonitrogen atoms of (c) to the C=C double bond in the α,β-position to the group $COOR^1$ shown in formula (I) in the carboxylic acid esters (a) is in the range from 10:1 to 1:10, subsequently reacting the intermediate product Z4 obtained with (d) one or more polyepoxides, the equivalent ratio of oxirane rings in polyepoxide (d) to reactive hydrogen atoms in the mono-, di- or polyaminopolyalkylene oxide compounds (c) being adjusted to a value of 100:1 to 1.5:1, and subsequently reacting the intermediate product Z5 obtained with (e) one or more primary and/or secondary amines, the equivalent ratio of oxirane rings in the intermediate product Z5 to the reactive H atoms at the aminonitrogen atoms of (e) being adjusted to a value of 1:1.5 to 1:20.

The foregoing observations on hardeners of the E1) type otherwise apply to the substances (a) and to the substances (c) to (e).

Hardeners of the E3) type are obtainable by (a) reacting one or more α,β-unsaturated carboxylic acid esters (I):

$$R^2R^3C=C(R^4)COOR^1 \qquad (I)$$

where $R^1$ is an aromatic or aliphatic radical containing up to 15 carbon atoms, the substituents $R^2$, $R^3$ and $R^4$ independently of one another represent hydrogen, branched or unbranched, aliphatic or aromatic groups containing up to 20 carbon atoms or a group —$(CH_2)_n$—$COOR^1$, where $R^1$ is as defined above and n is a number of 0 to 10, with (c) one or more mono-, di- or polyaminopolyalkylene oxide compounds, compounds (a) and (c) being used in such quantities that the equivalent ratio of the reactive hydrogen atoms at the aminonitrogen atoms of (c) to the C=C double bond in the α,β-position to the group $COOR^1$ shown in formula (I) in the carboxylic acid esters (a) is in the range from 10:1 to 1:10, subsequently reacting the intermediate product Z4 obtained with (g) one or more polyhydroxy compounds, the equivalent ratio of ester groups in the intermediate compound Z4 to hydroxy groups in the polyhydroxy compound (g) being adjusted to a value of 1:1.1 to 1:10, and subsequently reacting the intermediate product Z6 obtained with (d) one or more polyepoxides, the equivalent ratio of oxirane rings in polyepoxide (d) to hydroxyl groups in the intermediate product Z6 being adjusted to a value of 1.5:1 to 6:1, and subsequently reacting the intermediate product Z7 obtained with (e) one or more primary and/or secondary amines, the equivalent ratio of oxirane rings in the intermediate product Z7 to the reactive H atoms at the aminonitrogen atoms of (e) being adjusted to a value of 1:1.5 to 1:20.

The foregoing observations on hardeners of the E1) type otherwise apply to the substances (a) and to the substances (c) to (e).

The polyhydroxy compounds (g) may be aliphatic or aromatic. In one embodiment, the polyhydroxy compounds (g) are selected from the class of special aliphatic diols, namely alkanediols, especially dimer diols, polyether diols and polyester diols. The foregoing observations on hardeners of the E1) type in relation to component (b) apply to the alkanediols, including the dimerdiols, and the polyether diols. Polyesterdiols in the context of the invention are diols corresponding to the general formula $HOCH_2$—$R^7$—$CH_2OH$, where $R^7$ is a hydrophobic hydrocarbon radical which may be saturated or unsaturated, linear or branched and may also contain aromatic structural elements and in which one or more $CH_2$ units must each be replaced by a COO unit. They are normally produced by reacting difunctional polyols with dicarboxylic acids or anhydrides thereof. Commonly used polyols are ethylene glycol, propane-1,2-diol, butane-1,4-diol, hexane-1,6-diol. Typical dicarboxylic acids are succinic acid, adipic acid, phthalic anhydride. Hexane-1,6-diol adipic acid polyesters are particularly preferred.

In addition, so-called polyetheramines E4) may be used as hardeners E). These compounds are referred to hereinafter as type E4) hardeners. The polyetheramines (PEA) used for the purposes of the invention are diamino- or polyamino-polyalkylene oxide compounds. By this is meant that these compounds contain on the one hand two or more amino functions (NH or $NH_2$ functions) and, on the other hand, alkylene oxide units. The alkylene oxide units are in particular ethylene oxide, propylene oxide and butylene oxide, ethylene oxide and propylene oxide being particularly preferred.

The production of polyetheramines is known from the prior art and includes the reaction of compounds containing hydroxyl groups with alkylene oxides and subsequent conversion of the resulting terminal hydroxyl groups into amino groups. WO-A-97/03108 (cf. page 8, lines 13–19) cites corresponding prior art and states that polyetheramines are normally obtained by amination of polyethers with ammonia in the presence of catalysts, such as Ni/Cu/Cr for example.

So far as the reaction of compounds containing hydroxyl groups with alkylene oxides is concerned, ethoxylation and propoxylation are of particular importance. The procedure adopted is normally as follows: In a first step, the desired hydroxyl-containing compounds are contacted with ethylene oxide and/or propylene oxide and the resulting mixture is reacted in the presence of a catalyst at temperatures in the range from 20 to 200° C. Addition products of ethylene oxide (EO) and/or propylene oxide (PO) are obtained in this way. The addition products are preferably EO adducts or PO adducts or EO-PO adducts with the particular hydroxyl-containing compound. In the case of the EO-PO adducts, the addition of EO and PO may be carried out statistically or blockwise.

Suitable polyether blocks of the polyetheramines are, for example, polyethylene glycols, polypropylene glycols, copolymers of, for example, polyethylene glycols and polypropylene glycols, poly(1,2-butylene)glycols, poly(tetramethylene)glycols.

Particularly preferred polyetheramines E4) are diamines and triamines. "Diamines and triamines" are understood to be polyetheramines containing two or three terminal $NH_2$ groups per molecule. The diamines and triamines described in EP-B-634 424 and WO-A-97/03108 are most particularly preferred. The disclosures of these two documents in regard to the structure of these diamines and triamines are hereby expressly included in the teaching of the present invention. Reference is made in particular to the following passages:
in the case of EP-B-634 424: page 6, line 23 to page 7, line 36.
in the case of WO-A-97/03108: page 29, line 1 to page 31, last line.

According to the invention, particularly suitable diamines and triamines (of the PEA type) are those which are commercially obtainable from Hunstman Petrochemical Corporation under the name of "Jeffamine". The following types are particularly preferred for the purposes of the invention:
Jeffamine D-400
Jeffamine D-2000
Jeffamine D-4000
Jeffamine ED-600
Jeffamine ED-900
Jeffamine ED-2001
Jeffamine ED4000
Jeffamine ED-6000
Jeffamine T-3000
Jeffamine T-5000
Jeffamine ET-3000

These Jeffamine types may be used individually or in the form of mixtures with one another.

The polyetheramines E4) preferably have average molecular weights (number average; Mn) of 400 to 12,000 and more particularly in the range from 400 to 6,000.

Other suitable polyetheramines E4) are the commercially available "Pluronic" types known to the expert (manufacturer: BASF) and the "PC Amines" (manufacturer: Nitroil).

Additives and Processing Aids

Additives and/or processing aids known to the relevant expert may be added as component F) in the course of the process according to the invention. Examples include pigments, cement, gravel, deaerators, defoamers, dispersion aids, antisedimenting agents, accelerators, free amines, flow control additives, conductivity improvers. The following additives and/or processing aids are of particular interest:
fillers (component F1),
open time extenders (component F2),
rheology additives (component F3).

The function of fillers F1) is to reduce the cost of the basic formulation, to obtain special surface effects and to control the rheology of a system.

The combination of fillers has a critical effect on the storage stability and resistance of the final coating to chemicals. Calcium carbonates as fillers do of course show a relatively poor resistance to acidic chemicals. Sand—an important filler for obtaining the necessary layer thicknesses—is unsuitable for use as a sole filler on account of its coarse particle structure by comparison with conventional fillers. Combination with other inert additives only reduces this behavior to a small extent, but cannot compensate for the poor sedimentation behavior if good application properties are to be retained. However, the use of the fillers is indispensable for obtaining special surface effects. The degree of gloss and the cost of a coating and also its resistance to chemicals as mentioned above are dependent factors which are tied to the use of the correct combination of fillers.

The fillers used differ in their chemical character. For example, barium sulfates, silica flours, aluminium silicates, natural or synthetic calcium carbonates, silicates, calcium sulfate, talcum, kaolin, mica, feldspar, metals and metal oxides, aluminium hydroxide, carbon black, graphite and other fillers known to the expert may be used.

Suitable fillers have a specific gravity of 2 to 3 g/cm$^3$ and preferably 2.4 to 2.7 g/cm$^3$ and a bulk density of, in particular, 0.6 to 1.0 g/cm$^3$.

To avoid sedimenting problems and to establish the important processing viscosity, fillers with particle size distributions of 0 to 100 μm and preferably 0 to 50 μm are particularly appropriate. The particle size distribution is a distribution function of the particle size and is determined by particle size analysis and illustrated as a particle size distribution curve (for example particle size distribution curve to DIN 66165-1: 1097-04).

The following combinations are most particularly suitable as component F1): silica sand/Minex S 20, silica sand/Schwerspat (heavy spar) C 14 or silica sand/Calcicoll W 7. The substances mentioned here are commercially obtainable.

In one embodiment, component F1) is used in a quantity of 20 to 60% by weight.

Wax-based open-time extenders F2). Systems such as these are known to the expert (a definition of waxes can be found, for example, in U. Zorll, Ed., RÖMPP—Lexikon, Lacke und Druckfarben, p. 615, Georg Thieme Verl., Stuttgart, New York, 1998). Waxes in the form of aqueous emulsions or in solid supply forms on mineral support materials are used during processing to extend the open time and to increase the flexibility and plasticity of the filling and insulating compounds. The expression "waxes" encompasses both waxes in the narrower sense and fatty alcohols.

Corresponding wax-based processing additives are described in detail in R. Neumann, H.-G. Schulte, R. Höfer, Pulver, das Eigenschaften schafft, Bautenschutz und Bausanierung, Heft 3/1999, pp/22–27 and in U. Nagorny, Extension of workability of synthetic resin plasters with additives based on fatty raw materials; ConChem-Journal, No. 1/1994, pp. 23–26). Powder-form wax-based open-time extenders, more particularly fatty alcohols containing 16 to 72 carbon atoms per molecule on a solid support, are particularly suitable. In this connection, reference is specifically made to the disclosure of WO 98/49114. Particularly suitable wax-based open-time extenders are the products Loxanol® 842 DP (aqueous dispersion) and Loxanol® P (water-free powder-form solid) marketed by Cognis Deutschland GmbH, Düssledorf/DE.

In one embodiment, component F2) is used in a quantity of 0.1 to 2.0% by weight.

Rheology additives F3). Any rheology additives known to the expert, preferably layer silicates or poly (meth)acrylates or cellulose ethers or so-called associative thickeners, may be used individually or in combination.

Layer silicates in combination with hydrophobically modified polyether urethanes (HEURs) or hydrophobically modified polyethers (HMPEs) are preferably used. Hydrophobically modified means that hydrophobic groups are present in the molecules of the classes of compounds mentioned. Particularly preferred HEURs are the solventless HEURs described in G. Schulte, J. Schmitz and R. Höfer, Additive für wäβrige Systeme und umweltfreudliche Lacke, Welt der Farben, 28–31 (12/1997) and the pseudoplastic HEURs described in DE-A-42 42 687.

In one embodiment, component F3) is used in a quantity of 0.1 to 3.0% by weight.

Use

The present invention also relates to the use of compositions consisting of
A) 0.5 to 90% by weight epoxy resins excluding self-dispersing epoxy resins,
B) 0.5 to 90% by weight (meth)acrylates of a polyol,
C) 5.0 to 98.0% by weight water,
D) 0 or 0.1 to 3% by weight organic solvent and
X) 0.5 to 10% by weight one or more dispersants, with the following provisos:
the (meth)acrylates B) contain at least 2 reactive (meth)acrylic groups per molecule,
the sum of the percentages by weight of components A), B), C), D) and X) is 100% by weight and
the Brookfield viscosity of the composition (as measured at 23° C.) is less than 15,000 mPas for the production of coatings.

The present invention also relates to the use of the above-described coating compositions as levelling and insulating compounds, more particularly in the building industry. The use of the coating compositions for floors is particularly preferred.

EXAMPLES

Substances Used

Chem-Res E 30: liquid epoxy resin based on bisphenol A/F (Cognis Deutschland GmbH)

Photomer 4006: trimethylol propane triacrylate (manufacturer: Cognis Deutschland GmbH)

Photomer 4094: triacrylate of the reaction product of 1 mol glycerol with 3 mols propylene oxide (manufacturer: Cognis Deutschland GmbH)

Disponil 23: commercially available dispersant (manufacturer: Cognis Deutschland GmbH)

Waterpoxy 751: epoxy resin hardener (manufacturer: Cognis Deutschland GmbH)

Water-based Coating Compositions

Example 1

Invention

The following composition was prepared by combining and stirring the individual components:
60 parts by weight Chem Res E 30
10.4 parts by weight Photomer 4006
40 parts by weight water
2 parts by weight Disponil 23

Example 2

Invention

As Example 1 except that Photomer 4094 was used instead of Photomer 4006 (same quantity by weight).

Application Examples

Example 3

Invention 71.2 parts by weight Waterpoxy 751 were added to the composition of Example 1. The mixture was applied to a metal substrate in a layer thickness of 30 μm and left to cure.

Example 4

Invention 71.2 parts by weight Waterpoxy 751 were added to the composition of Example 2. The mixture was applied to a metal substrate in a layer thickness of 30 μm and left to cure.

Example 5

Comparison

The following composition was prepared by combining and stirring the individual components:
60 parts by weight Chem Res E 30
40 parts by weight water
2 parts by weight Disponil 23
71.2 parts by weight Waterpoxy 751 were added to this composition. The mixture was applied to a metal substrate in a layer thickness of 30 μm and left to cure.

The gel time as defined in DIN 16945 was determnined as a measure of the processing time of the compositions of Examples 3 and 4 and Comparison Example 5. The results obtained are set out in Table 1.

TABLE 1

| Example | Gel time to DIN 16945 [mins.] |
| --- | --- |
| Example 3 (invention) | 2 |
| Example 4 (invention) | 10 |
| Example 5 (invention) | 300 |

What is claimed is:

1. A water-based coating composition consisting of:
(a) from 0.5 to 90% by weight of at least one epoxy resin other than self-dispersing epoxy resin; (b) from 0.5 to 90% by weight of at least one (meth)acrylate of a polyol; (c) from 5.0 to 98.0% by weight of water; and (d) from 0.5 to 10% by weight of one or more dispersants; wherein the at least one (meth)acrylate comprises at least two (meth)acrylate groups per molecule, and wherein the Brookfield viscosity of the composition is less than 15000 mPas.

2. The composition according to claim 1, wherein the solubility of the at least one (meth)acrylate of a polyol in water is less than 0.1 g/l.

3. The composition according to claim 1, wherein the at least one epoxy resin is present in an amount of from 5 to 50% by weight.

4. The composition according to claim 1, wherein the at least one epoxy resin is present in an amount of from 20 to 50% by weight.

5. The composition according to claim 1, wherein the water is present in an amount of from 10 to 50% by weight.

6. The composition according to claim 1, wherein the water is present in an amount of from 35 to 50% by weight.

7. The composition according to claim 1, wherein the at least one (meth)acrylate of a polyol comprises trimethylol propane triacrylate.

8. The composition according to claim 1, wherein the one or more dispersants comprises a surfactant selected form the group consisting of anionic and nonionic surfactants.

9. A water-based coating composition consisting of: (a) from 0.5 to 90% by weight of at least one epoxy resin other than self-dispersing epoxy resins; (b) from 0.5 to 90% by weight of at least one (meth)acrylate of a polyol; (c) from 5.0 to 98.0% by weight of water; (d) from 0.5 to 10% by weight of one or more dispersants; and (e) from 0.1 to 3% by weight of an organic solvent; wherein the at least one (meth)acrylate comprises at least two (meth)acrylate groups per molecule; and wherein the Brookfield viscosity of the composition is less than 15,000 mPas.

10. A method for preparing a cured coating composition, said method comprising:
(A) providing a coating composition consisting of: (a) from 0.5 to 90% by weight of at least one epoxy resin other than self-dispersing epoxy resins; (b) from 0.5 to 90% by weight of at least one (meth)acrylate of a polyol; (c) from 5.0 to 98.0% by weight of water; and (d) from 0.5 to 10% by weight of one or more dispersants; wherein the at least one (meth)acrylate comprises at least two (meth)acrylate groups per molecule; and wherein the Brookfield viscosity of the composition is less than 15,000 mPas;
(B) contacting the composition with from 1 to 200% by weight, based on the at least one epoxy resin, of a water-dilutable hardener; and
(C) allowing the composition and hardener to cure.

11. The method according to claim 10, wherein the solubility of the at least one (meth)acrylate of a polyol in water is less than b 0.1 g/l.

12. The method according to claim 10, wherein the at least one epoxy resin is present in an amount of from 5 to 50% by weight.

13. The method according to claim 10, wherein the at least one epoxy resin is present in an amount of from 20 to 50% by weight.

14. The method according to claim 10, wherein the water is present in an amount of from 10 to 50% by weight.

15. The method according to claim 10, wherein the water is present in an amount of from 35 to 50% by weight.

16. The method according to claim 10, wherein the at least one (meth)acrylate of a polyol comprises trimethylol propane triacrylate.

17. The method according to claim 10, wherein the one or more dispersants comprises a surfactant selected from the group consisting of anionic and nonionic surfactants.

18. A method for preparing a cured coating composition, said method comprising:
(A) providing a coating composition consisting of: (a) from 0.5 to 90% by weight of at least one epoxy resin other than self-dispersing epoxy resins; (b) from 0.5 to 90% by weight of at least one (meth)acrylate of a polyol; (c) from 5.0 to 98.0% by weight of water; (d) from 0.5 to 10% by weight of one or more dispersants; and (e) from 0.1 to 3% by weight of an organic solvent; wherein the at least one (meth)acrylate comprises at least two (meth)acrylate groups per molecule; and wherein the Brookfield viscosity of the composition is less than 15,000 mPas;
(B) contacting the composition with from 1 to 200% by weight, based on the at least one epoxy resin, of a water-dilutable hardener; and
(C) allowing the composition and hardener to cure.

* * * * *